United States Patent [19]

Saitoh et al.

[11] Patent Number: 5,434,688
[45] Date of Patent: Jul. 18, 1995

[54] LIGHT SCATTERING LIQUID CRYSTAL CELL HAVING BLACK PATTERNS AND OPAQUE MASK FORMED ON OPPOSITE SUBSTRATES

[75] Inventors: Yukito Saitoh, Machida; Mayumi Teruya, Minato, both of Japan

[73] Assignee: International Business Machines Corporation, Armonk, N.Y.

[21] Appl. No.: 204,702

[22] Filed: Mar. 2, 1994

[30] Foreign Application Priority Data

Mar. 2, 1993 [JP] Japan .................. 5-041154

[51] Int. Cl.⁶ ............ G02F 1/1333; G02F 1/137
[52] U.S. Cl. .................... 359/67; 359/48; 359/51; 359/68
[58] Field of Search ......... 359/48, 51, 52, 66, 359/67, 68, 99

[56] References Cited

U.S. PATENT DOCUMENTS

| | | | |
|---|---|---|---|
| 4,021,945 | 5/1977 | Sussman | 359/48 |
| 4,626,074 | 12/1986 | Crossland et al. | 359/48 |
| 4,707,080 | 11/1987 | Fergason | 359/48 |
| 4,726,662 | 2/1988 | Cromack | 359/40 |
| 4,732,456 | 3/1988 | Fergason et al. | 359/51 |
| 5,099,343 | 3/1992 | Margerum et al. | 359/48 |
| 5,103,326 | 4/1992 | Fergason | 359/51 |
| 5,285,298 | 2/1994 | Kaneko et al. | 359/45 |

FOREIGN PATENT DOCUMENTS

| | | | |
|---|---|---|---|
| 1-241520 | 9/1989 | Japan | 359/51 |
| 3-175421 | 7/1991 | Japan | . |
| 6-027450 | 2/1994 | Japan | 359/51 |

Primary Examiner—William L. Sikes
Assistant Examiner—Tai V. Duong
Attorney, Agent, or Firm—Ronald L. Drumheller

[57] ABSTRACT

The object of this invention is to provide a light scattering liquid crystal display applicable to direct view type displays which realizes a structure with uniform-brightness and high-contrast. A liquid crystal display of this invention including a light scattering liquid crystal cell 10 comprising: polymer dispersed liquid crystal; a first surface and a second surface defining the liquid crystal cell 10; a background having black patterns 17, each occupying an area covering at least display pixel, and first openings 19 existing between the black patterns on the first surface; and opaque mask 21 having second openings 23 and shading the locations opposite to the first openings 19.

14 Claims, 1 Drawing Sheet (a) WHEN NO ELECTRIC FIELD IS APPLIED (b) WHEN AN ELECTRIC FIELD IS APPLIED

LIGHT SCATTERING LIQUID CRYSTAL CELL HAVING BLACK PATTERNS AND OPAQUE MASK FORMED ON OPPOSITE SUBSTRATES

BACKGROUND OF THE INVENTION

1. Field of the Invention

This invention relates to a light scattering liquid crystal display applicable to direct view type displays, and more particularly to liquid crystal displays including the light scattering liquid crystal cells of polymer dispersed liquid crystals or the like which provide uniform brightness and high contrast.

2. Description of the Related Art

There are various kinds of liquid crystal materials and their orientations. Displaying methods are largely divided into two types, one is the light polarizing type which uses the change of double refraction effect in liquid crystal with polarizers under applying electric field, and another is the light scattering type. The most commonly used one effecting light polarizing type cell is twisted nematic (TN) liquid crystal cell, which is capable of attaining high display quality by active matrix drive system using thin-film transistors. In a simple matrix drive system, where a particular pixel is selected by an array of column electrodes X and row electrodes Y, the predominant trend is toward the use of super twisted nematic (STN) liquid crystal cell, improved on TN liquid crystal cell, to insure the quality. In addition to conventional dynamic light scattering liquid crystals, recently proposed polymer dispersed liquid crystals are gathering attention as light scattering liquid crystals. Light scattering liquid crystal displays carry out selective display in either a scattering or transmitting state of incident light through changing the states of liquid crystals under the influence of an electric field and hence require no polarizer. Since they obviate the need to cut incident light with a polarizer (which would otherwise cut at least half the incident light), light scattering liquid crystal displays are advantageous in bringing about not only a brighter displays but also a wider angle of visibility. Also, especially in the case of polymer dispersed liquid crystal cells, they obviate otherwise necessary rubbing treatment for the orientation of liquid crystals in cell formation, the spraying of a spacer (gapping material), and other complex processes, such as the impregnation and sealing of liquid crystals, thereby enabling a marked simplification of the cell forming processes. Fox this reason, this method carries with it great expectations with regard to application in terms of the easy realization of larger display sizes, and the possible use of plastic substrates.

As far as polymer dispersed liquid crystal cells are concerned, several kinds of structures have been proposed such as ones wherein a plurality of liquid crystal molecules of a size falling on the order of micrometers are dispersed in a macromolecular polymer, ones with liquid crystals impregnated in a mesh-like polymer, etc. As FIG. 2 shows, when no electric field is applied (a), liquid crystal molecules orient in random directions, wherein light is intensively scattered on the interface between the liquid crystal molecules and the polymer as medium where the refraction factors of them are different with the result of an opaque display. When an electric field is applied (b), on the other hand, the directions of liquid crystals are uniformized in a homeotropic orientation, so that the refraction factor of the liquid crystal molecules agrees with that of the polymer and thus a transparent display results from the liquidation of the scattering state.

Generally, two displaying modes are available in the light scattering liquid crystal cells, including polymer dispersed liquid crystal cells, that is white and transparent. Hence, whereas light scattering liquid crystal cells can cope sufficiently with white and transparent displaying modes in their own capacity insofar as they are used for projection-type displays, it is necessary to set them white-black displaying mode for direct view type displays. It is common to adopt the method of arranging black light absorbers over the background of a light scattering liquid crystal cell to color the transparent mode in black. Accordingly, the research and development of direct view type displays using polymer dispersed liquid crystals have so far been pursued only on reflection-type displays dependent exclusively on the ambient light on the observer side. However, the light scatter of polymer dispersed liquid crystals in a light scattering state is low and thus a display in white is dark. It is impossible to present a sharp contrast unless the cell is thickened, resulting in a higher drive voltage. On the other hand, when polymer dispersed liquid crystals are applied to transmission-type displays which are capable of bright display with a light source behind the display, it is essentially impossible to make a display in black by the aforementioned method and therefore it has been necessary to find another solution.

PUPA 03-175421, relating to a transmission-type display using polymer dispersed liquid crystal cells, discloses two modes: one mode is such that light absorbers are arranged slightly apart from the polymer dispersed liquid crystal cell and thus ambient light is received from both front and behind, as shown in FIG. 1 of the aforementioned application; the other is such that light absorbers are arranged slightly apart from the polymer dispersed liquid crystal cell and a light source is put at a point out of view of the observer, whereby light is taken in the cell from the space between the light absorbers and the polymer dispersed liquid crystal cell, as shown in FIG. 2 of the aforementioned application.

However, there are several disadvantages to arranging light absorbers apart from a liquid crystal cell. First, the need to leave a space between light absorbers and a liquid crystal cell entails the thicker display design rather than any conventional display, in which case it becomes difficult to thin down the liquid crystal display. Second, the inability to receive uniform light directly from behind the display area entails the reception of light from only the periphery of the display area, in which case only the edges of the display area become brighter, result in irregular brightness within the display area. Hence, obtaining uniform brightness entails a design alteration of the optical system and the addition on otherwise superfluous structures such as a light compensating plate, which deters us from making the most of the advantageous features (lightness and thinness) of liquid crystal displays. Moreover, such a space left between the light absorbers and liquid crystals might work toward whitening a black display.

SUMMARY OF THE INVENTION

One object of this invention is to provide a light scattering liquid crystal display that is applicable as a direct view type display and capable of presenting a sharp contrast.

Another object of the invention is to provide a light scattering liquid crystal display that achieves even brightness over the whole displaying area, and is light weight and thin.

These and further objects and features have been achieved by this invention, which provides a light scattering liquid crystal cell comprising:

a first surface and a second surface defining the light scattering liquid crystal cell;

a background having black patterns, each occupying an area covering at least display pixel, and first openings existing between said black patterns on said first surface; and an opaque mask having second openings opposite to said black patterns and shading the locations opposite to said first openings on said second surface.

Accordingly, the configuration of the light scattering liquid crystal cell of this invention has openings through which light transmits and shading sections which shade light compensatingly on the first surface and the second surface defining the liquid crystal cell.

Also, this invention provides a liquid crystal display including said liquid crystal cell.

Moreover, this invention provides a color liquid crystal display by coloring each second openings of such a liquid crystal cell in at least one of the three primary colors.

This invention can provide a light scattering liquid crystal display applicable to direct view type displays. The display according to this invention provides uniform and intense brightness on account of the introduction of light into the liquid crystals through the first openings arrayed in the background substrate and the opaque mask facing the observer, thus cutting off excess light from the background substrate. Moreover, the otherwise necessary thickening of the liquid crystal cell is obviated to help actualize lighter and thinner liquid crystal displays.

DESCRIPTION OF A PREFERRED EMBODIMENT

Figure 1:
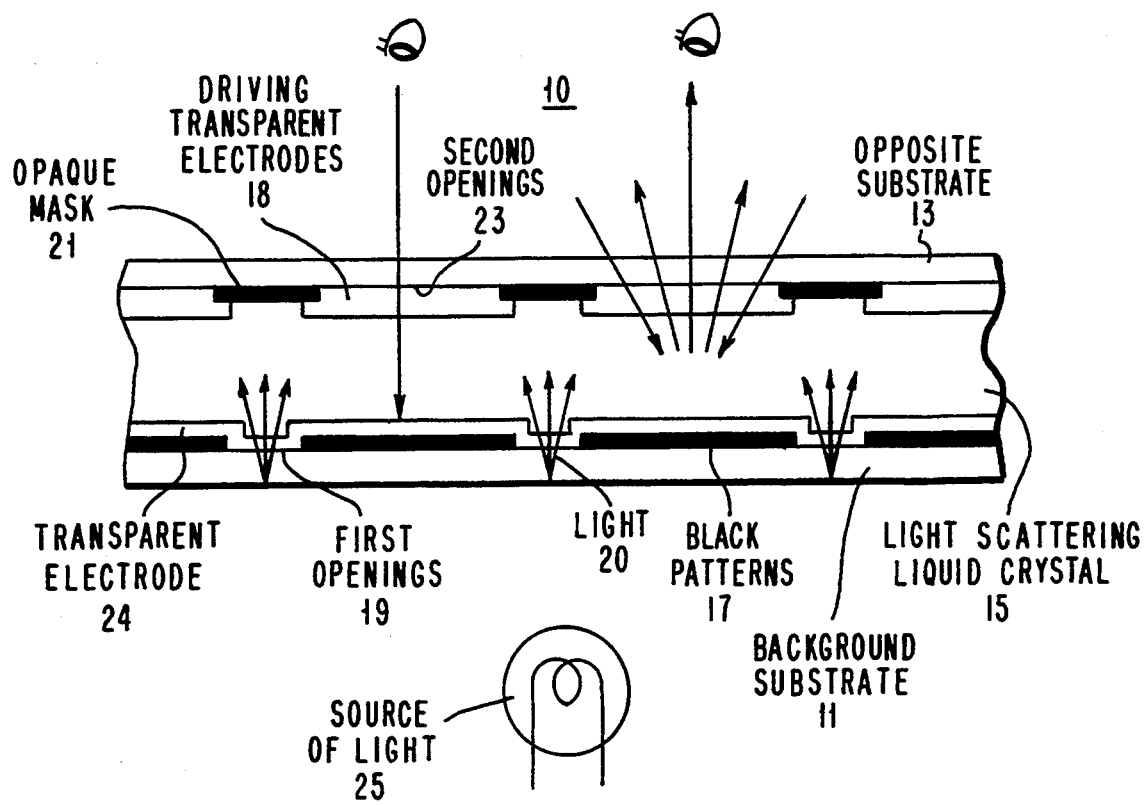
FIG. 1 is a schematic sectional view of a liquid crystal cell of this invention.
Figure 2:
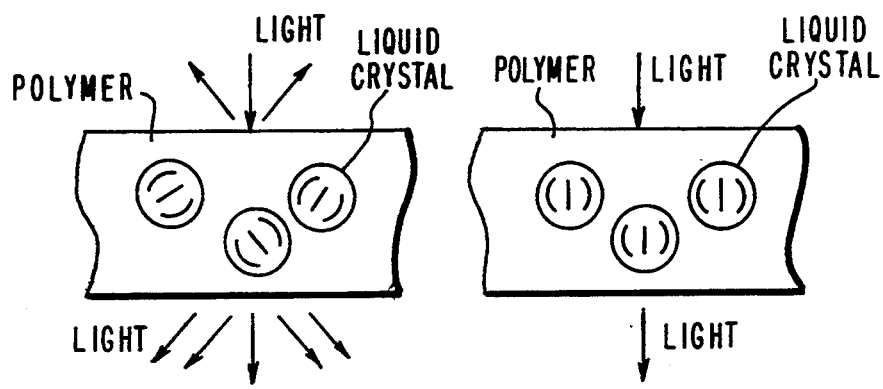
FIG. 2 is a systematic view of light scattering through polymer dispersed liquid crystals.

FIG. 1 is a schematic view of a liquid crystal cell 10 according to this invention. Referring to FIG. 1, light scattering liquid crystal 15 is sandwiched between two transparent planar glass substrates 11 and 13. The light scattering liquid crystal 15 should preferably be a polymer dispersed liquid crystal, which is typically formed by emulsifying a liquid crystal material in a solution of a water-soluble polymer, applying the liquid crystal material to either one of the substrates, and drying the liquid material. Then, the one substrate is put on the other substrate to form a cell. However, there are other methods, such as the method of casting a solution of polymers and liquid crystals in a common solvent on a substrate, the method of impregnating the spaces in a porous polymer film with liquid crystals, the method of casting liquid crystals emulsified and dispersed in an aqueous solution of polymers on a substrate, the method of polymerizing monomers out of a mixed solution of liquid crystals and polymeric monomers, etc., and any of these methods may be adopted. Furthermore, it is also possible to use other light scattering liquid crystals.

Also, there are black patterns 17 formed on the background substrate 11 of the liquid crystal cell 10. These black patterns 17 produce the same effect as conventional light absorbers, but have a shape particular to this invention rather than being arranged over the background substrate 11 as in conventional light absorbers. To be specific, such black patterns 17 each occupy one or more times as much area, defined by driving transparent electrodes 18, as a single display pixel does. Also, first openings 19 are arranged within the adjacent black patterns 17 on the background substrate 11. By adopting such a structure, this invention enables light 20 to be uniformly received from behind over the entire display area through the background substrate 11 and first openings 19, and also obviates the need to put a source of light 25 near the end of the liquid crystal cell 10. Most preferably, the black patterns 17 should each take the shape of a square corresponding to one single pixel. Nonetheless, each black pattern 17 may also take the shape of a square including four pixels, for instance, or else the shape of a rectangle, a striped pattern including four or more pixels, etc. Again, the size of each first opening 19 depends on these factors. The black patterns 17 may be formed from any light absorptive material, whether organic or inorganic, e.g., a polymer material with a dispersed black pigment or dyestuff, carbon film, surface roughened metal film, or black paper. A choice shall be made as to whether the black patterns 17 are to be arranged on the inside or outside of the background substrate 11 according to the properties of the substrate, the material of the light absorber, and their required tolerances.

Also, there is an opaque mask 21 formed on the opposite substrate 13 in front of the liquid crystal cell 10. This opaque mask 21 blocks off light through the first openings 19 and the light scattering liquid crystal 15 so that the light should not arrive at an observer's eyes. Hence, the opaque mask 21 is arranged opposite the first openings 19 in the compensatory form of the first openings 19. In this respect, it is preferable that the opaque mask 21 be larger in area than the first openings 19 so that the opaque mask 21 should perfectly block off light past the first openings 19 and the light scattering liquid crystal 15. As a result, second openings 23 are formed in the opaque mask 21 on the opposite substrate 13. The second openings 23 are at locations opposite the black patterns 17, and are less than or equal to the black patterns 17 in terms of area. The opaque mask 21 may be made of any material, whether organic or inorganic, e.g., a polymer material with a disparsed black pigment or dyestuff, carbon, carbon film, etc., and can be formed on the inside or outside of the opposite substrate 13.

The relationship in size between the opaque mask 21 and the first openings 19 shall be determined according to the distance between the background substrate 11 and the opposite substrate 13, the refraction factor of the light scattering liquid crystal 15, the angle of visibility of the liquid crystal cell 10, and so forth, so that the light 20 received through the first openings 19 into the liquid crystal cell 10 should not reach an observer's eyes when the light scattering liquid crystal 15 is brought to a state of light transmission with a voltage applied to the electrodes of the liquid crystal cell 10.

Liquid crystal can be driven by either the simple matrix system, or the active matrix system. In the case of the simple matrix system, the substrates 11 and 13 are each formed so that the stripe-shaped transparent electrodes mutually intersect above and below. After an Iridium/Tin Oxide (ITO) film, for example, is applied to the entire face of the substrate, and patterned to form the transparent electrodes by photolithographic technology. In the active matrix system, thin-film transistors may be provided an either the background substrate 11 or the opposite substrate 13. If it is provided on the opposite substrate 13 it may be possible to set driving transparent electrodes 18 in the second opening 23 because part of the wiring of the thin-film transistors, the auxiliary capacitor sections, etc., possess a shielding operation, and that the special opaque mask 21 is not necessary due to the fact that the thin-film transistors are provided in a part of opaque mask 21. In this case, the ITO film acting as the opposing transparent electrodes 24 are applied to the entire face of the background substrate 11.

Contrariwise, if the thin-film transistors are provided in the background substrate 11 the entire surface, including the opaque mask 21 of the opposite substrate 13, is covered by the ITO film.

Here, attention must be paid to the relationship between the black patterns 17 or the opaque mask 21 and the ITO film (including the display electrodes as part of the thin-film transistor) where the black patterns 17 are formed on the inside of the background substrate 11 or the opaque mask 21 is formed on the inside of the opposite substrate 13. If the material of the black patterns 17 or opaque mask 21 is electro-conductive, no problem wall arise. However, if the material is not electro-conductive but insulative, the ITO film shall be formed on the black patterns 17 or the opaque mask 21 so that the liquid,crystal can be effectively actuated by a small applied voltage. Yet, even if there were no such positional relation available, it would be apparent that the user has only to set the applied voltage higher.

As shown in FIG. 1, since the light scattering liquid crystal 15 transmit light when a voltage is applied, that is, electric field is generated, between the transparent electrodes 18 and 24, the black patterns 17 on the background substrate 11 come into view of the observer. The light 20 from the first openings 19 is then blocked off by the opaque mask 21, so that the black patterns 17 go out of view of the observer. On the other hand, the light scattering liquid crystal 15 scatters light when no electric field is applied between the transparent electrodes 18 and 24. Hence, the observer can then see not only scattered light from the front of the liquid crystal cell 10 but also a display in white including scattered light of the light 20 from the first openings 19 in the rear, and the screen of the liquid crystal cell 10 brightens. Thus, an image is displayed with high contrast.

A color display, if desired, can be easily obtained by coloring each of the second openings 23 in at least one of the three primary colors (red, blue, and green). In this structure, pixels in red, blue, or green are observed at the scattering displaying state of the liquid crystal cell 10, on the other hand, at the transparent display state, black pixels are observed.

Although this invention does not necessarily entail providing a source of light inasmuch as ambient light enters from behind, it is permissable to put a source of light 25 behind the background substrate 11 in order to make the entire screen still brighter.

Also, it is effective to give some treatment to the sections corresponding to the first openings 19 of the background substrate 11, so that incident light 20 should be scattered more. For example, toughening the surfaces of the first openings 19 of the background substrate 11, utilizing ground glass, etc.

We claim:

1. A light scattering liquid crystal cell comprising:
   a first surface and a second surface, defining said light scattering liquid crystal cell;
   a background having black patterns, each occupying an area covering at least one display pixel, and first openings existing between said black patterns on said first surface; and
   an opaque mask having second openings opposite to said black patterns and shading the locations opposite to said first openings on said second surface.

2. A light scattering liquid crystal cell according to claim 1, in which said light scattering liquid crystal cell including polymer dispersed liquid crystals.

3. A light scattering liquid crystal cell according to claim 1 or 2, in which said opaque mask being larger than said first openings.

4. A light scattering liquid crystal cell according to claim 1 or 2, in which said second openings of said opaque mask each being colored in at least one of the three primary colors.

5. A light scattering liquid crystal cell according to claim 1, in which said opaque mask being made of a black pigment dispersed material or a metal.

6. A light scattering liquid crystal cell according to claim 1 or 2, further including thin-film transistors on the side of said second surface.

7. A light scattering liquid crystal cell according to claim 6, in which at least part of said opaque mask being made up a wiring structure of said thin-film transistors.

8. A liquid crystal display comprising:
   a light scattering liquid crystal cell;
   a first surface and a second surface defining said light scattering liquid crystal cell;
   a background having black patterns each occupying an area covering at least one display pixel, and first openings existing between said black patterns on said first surface; and
   an opaque mask having second openings opposite to said black patterns and shading the locations opposite to said first openings on said second surface.

9. A liquid crystal display according to claim 8, in which said light scattering liquid crystal cell including polymer dispersed liquid crystals.

10. A liquid crystal display according to claim 8 or 9, in which light being introduced through said first openings of said background into said liquid crystal cell.

11. A liquid crystal display according to claim 10, further including a light source irradiating said liquid crystal cell from the side of said first surface.

12. A liquid crystal display according to claim 8 or 9, in which said opaque mask being larger than said first openings.

13. A liquid crystal display according to claim 8 or 9, in which said second openings of said opaque mask each being colored in at least one of the three primary colors.

14. A liquid crystal display according to claim 8 or 9, further including thin-film transistors on the side of said second surface.

* * * * *